Figure 1:
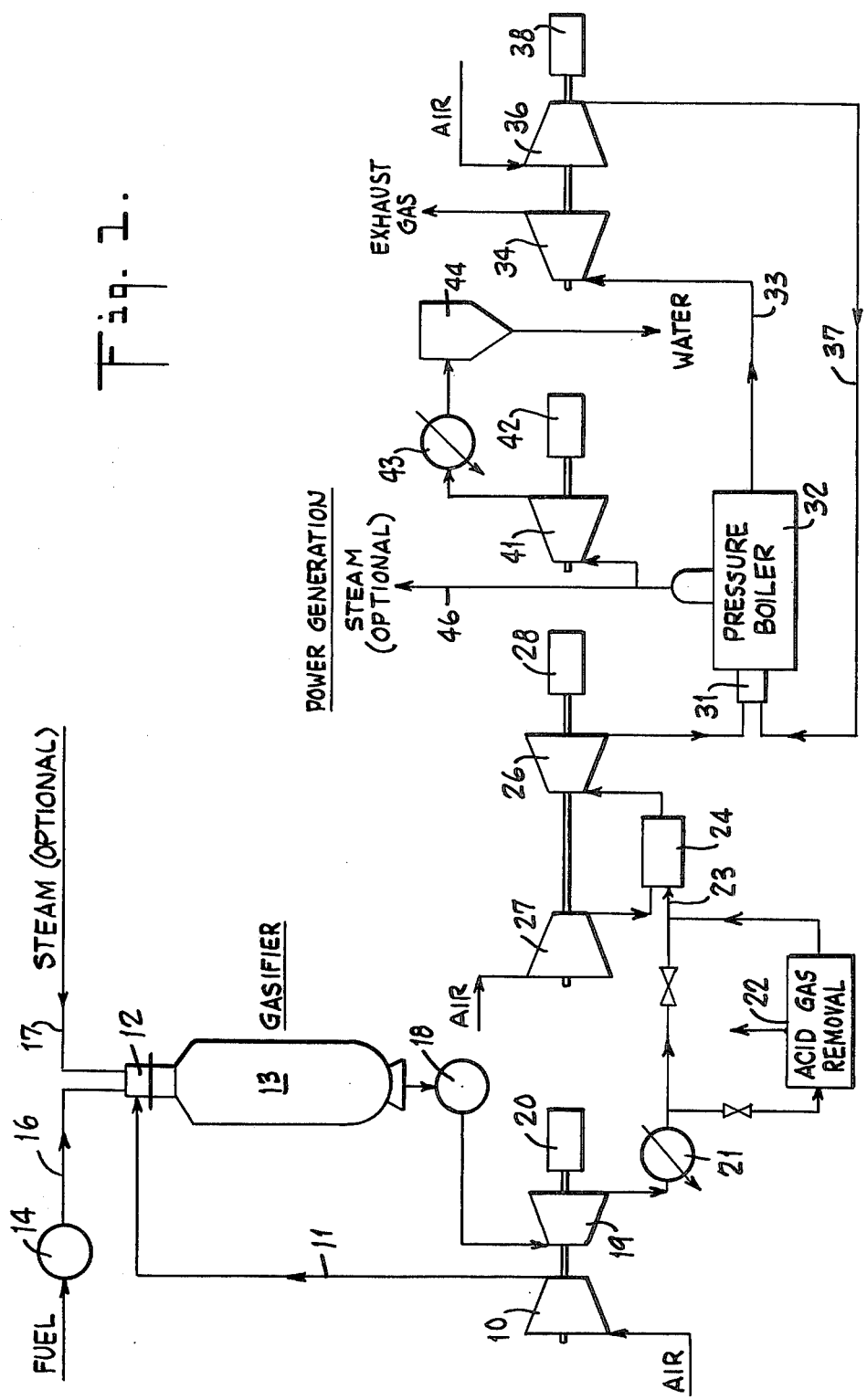

United States Patent [19]

Muenger et al.

[11] 4,193,259

[45] Mar. 18, 1980

[54] PROCESS FOR THE GENERATION OF POWER FROM CARBONACEOUS FUELS WITH MINIMAL ATMOSPHERIC POLLUTION

[75] Inventors: James R. Muenger, Beacon; Everett M. Barber, Wappingers Falls, both of N.Y.

[73] Assignee: Texaco Inc., White Plains, N.Y.

[21] Appl. No.: 42,272

[22] Filed: May 24, 1979

[51] Int. Cl.$^2$ ............................ F02C 7/02; F02G 3/00
[52] U.S. Cl. ..................................... 60/39.04; 48/215; 60/39.12; 60/39.17; 60/39.18 B
[58] Field of Search ...................... 48/197 R, 202, 206, 48/215; 252/373; 60/39.02, 39.18 B, 39.04, 39.17

[56] References Cited

U.S. PATENT DOCUMENTS

| | | | |
|---|---|---|---|
| 3,868,817 | 3/1975 | Marion et al. | 48/215 |
| 4,092,825 | 6/1978 | Egan | 60/39.12 |
| 4,132,065 | 1/1979 | McGann | 60/39.12 |

*Primary Examiner*—S. Leon Bashore
*Assistant Examiner*—George C. Yeung
*Attorney, Agent, or Firm*—Carl G. Ries; Robert A. Kulason; Robert Knox

[57] ABSTRACT

This invention relates to a process for the efficient production of power by the oxidation of carbonaceous or hydrocarbon fuels with minimal pollution of the atmosphere. In one of its more specific aspects, this object is accomplished by partial oxidation of the hydrocarbon or other carbon-containing fuels to produce a fuel gas, followed by partial oxidation of this fuel gas and finally complete combustion of the gaseous products of the second partial oxidation with the generation of power in stages following each of the oxidation steps such that the stack gas discharged to the atmosphere is low in oxides of nitrogen and is substantially free from sulfur compounds. The process is particularly suitable for use with sulfur-containing petroleum residua, shale oils and the like.

7 Claims, 2 Drawing Figures

PROCESS FOR THE GENERATION OF POWER FROM CARBONACEOUS FUELS WITH MINIMAL ATMOSPHERIC POLLUTION

The demand for energy, particularly electrical energy, is expanding at a rate such that it is no longer possible to generate all of the needed electrical energy from the readily available non-polluting sources of power such as water power, geothermal energy, solar energy, and the like.

Natural gas, and other sulfur-free carbonaceous fuels, such as low sulfur coals and fuel oils, have in recent years been in such great demand relative to the quantities available that it is no longer feasible to supply the electrical generation plants with required amounts of clean fossil fuels. There are still abundent supplies, especially in the United States, of lower grade fuels and fuels having relatively high sulfur contents or relatively high nitrogen contents, or both.

It has been proposed heretofore to combust fuel in a plurality of states, i.e., partial combustion followed by complete combustion, and to remove sulfur from fuels prior to combustion or to remove sulfurous gases from the intermediate or final products of combustion.

The process of this invention comprises a novel system for consuming sulfur-containing fuels with efficient conversion of thermal energy available from the fuel on oxidation to useful heat and power.

Sulfur containing gases and oxides of nitrogen formed by combustion of these fuels are removed or their formation minimized.

The process of this invention produces power efficiently from fuels, including low grade high-sulfur content fuels, while minimizing air pollution problems.

In accordance with the process of the present invention, carbonaceous fuel is subjected to partial oxidation with air at a pressure in the range of 40 to 170 atm (590 to 2500 psia) and at a temperature in the range of 1000 to 1650° C. (1800° to 3000° F.) effecting conversion of the carbonaceous fuel to a high pressure gaseous fuel stream comprising carbon monoxide, hydrogen, and methane and having a relatively high heating value, i.e., a higher heating value in the range of 2.24 to 13.04 MJ/m$^3$ (60 to 350 Btu's per standard cubic foot dry gas). The high temperature, high pressure gaseous fuel stream is expanded from the pressure of the partial oxidation step to an intermediate pressure in the range of 20 to 35 atmospheres (300 to 500 psia), effecting simultaneous cooling of the fuel gas stream and the generation of power.

If the original carbonaceous fuel contains sulfur compounds, the fuel gas stream at the intermediate pressure in the range of 20 to 35 atm may be treated for the removal of acid gases, i.e., carbon dioxide, hydrogen sulfide, and carbonyl sulfide. The gaseous fuel, with or without the removal of sulfur compounds, is subjected to partial oxidation with air at a pressure in the range of 20 to 35 atm and at a temperature in the range of 815° to 1370° C. (1400° to 2500° F.) to produce a low heating value gaseous mixture containing hydrogen and carbon monoxide having a higher heating value in the range of 1.49 to 8.68 MJ/m$^3$ (40 to 233 Btu's per standard cubic foot.)

The low heating value gaseous mixture is then expanded in an engine to a lower pressure in the range of 2 to 3.5 atm (30 to 50 psia) thereby producing an additional amount of power and simultaneously cooling the low heating value gaseous mixture. The expanded low heating value fuel gas may be treated for the removal of sulfur compounds, if present, and is then subjected to complete combustion with air, preferably in a furnace maintained at a pressure in the range of 2 to 3.5 atm (30 to 50 psia) to generate steam which, in turn, may be used for the production of additional amount of power. Finally, the fuel gases comprising products of complete combustion are discharged from the furnace to a gas turbine where the gases are expanded to atmospheric pressure with the further production of power. The gases discharged from the final gas turbine are relatively cool and are substantially free from sulfur compounds and oxides of nitrogen.

A principal object of this invention is to provide an improved process for the generation of power from sulfurcontaining fuels in an economical and efficient manner with the production of an effluent stack gas which may be discharged to the atmosphere with minimum pollution.

Figure 2:
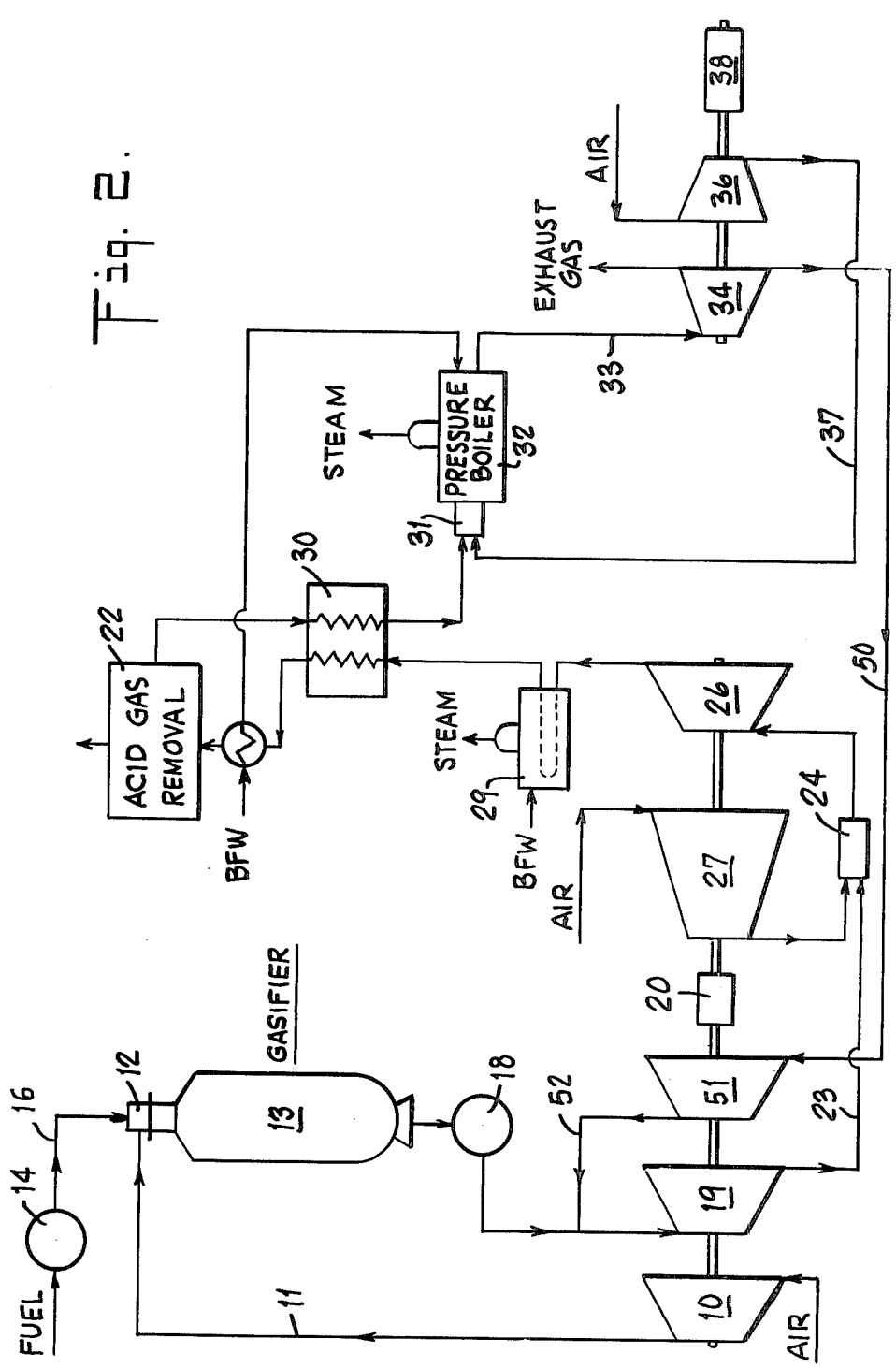

FIGS. 1 and 2 of the drawings are schematic representations of preferred embodiments of the process of this invention.

With reference to FIG. 1 of the drawings, air is compressed in an air compressor 10 to a pressure about 102 atm (1500 psia) and passed through a supply line 11 to a suitable mixer-burner 12 of a high pressure partial oxidation reactor 13. Carbonaceous fuel, which may comprise sour natural gas or refinery off-gases, sulfur-containing fuel oil, shale oil, liquefied coal residues, pulverized coal, or the like, is supplied at a suitable elevated pressure by a pump 14 through flow line 16 to a burner 12 of the partial oxidation reactor 13.

The partial oxidation reaction suitably is carried out in a reaction vessel of the type described in U.S. Pat. No. 2,582,938 to DuBois Eastman, incorporated herein by reference.

The feedstreams to the reaction zone preferably comprise air at a temperature in the range of 315° to 370° C. (600° to 700° F.). Steam for atomizing the fuel, if required, may be supplied to the burner 12 of the reactor 13 through a flow line 17 at a suitable pressure and temperature in the range of about 255° to 620° C. (490° to 1150° F.). The reaction is carried out in the high pressure partial oxidation reactor 13 at an autogenous temperature in the range of 980° to 1650° C. (1800° to 3000° F.) with consumption of the combustible portions of the fuel to produce a high pressure fuel gas comprising carbon oxides, steam, hydrogen, nitrogen, and methane, with the incidental production of gaseous sulfur-containing compounds, principally hydrogen sulfide and carbonyl sulfide.

The high pressure fuel gas product stream discharged from the reactor 13 at a pressure of about 102 atm (1500 psia) and a temperature in the range of about 980° to 1650° C. (1800° F. to 3000° F.) is passed to a slag trap 18 or particulate separator to permit molten slag, and particles of ash and refractory to separate by gravitational forces from the gas stream, and then passed to a gas turbine 19. In the gas turbine 19, the pressure of the fuel stream is reduced from 102 atm (1500 psia) to a pressure in the range of 20.4 to 34 atm (300 to 500 psia). Power generated by the gas turbine is utilized to drive air compressor 10 to compress air for the process and may be used also to drive generator 20 to generate electricity.

Exhaust gas from the gas turbine 19 is passed through cooler 21, suitably in the form of a recuperator which may be used to preheat air or gas to one or more partial oxidation reactors as explained hereinafter, and subsequently passed to an acid gas removal step for the removal of sulfur compounds from the fuel gas stream to produce clean fuel gas. Carbon dioxide may be left in the fuel gas.

The removal of acid gases from the fuel gas stream in the acid gas removal step 22 may be effected by any of the standard gas purification systems, for example, by scrubbing the gas stream with molten alkali salts, or with an aqueous solution of hot potassium carbonate, or, with an aqueous solution of an amine, such as ethanolamine.

The clean fuel gas so produced has a higher heating value in the range of 2.24 to 13.04 MJ/m$^3$ (60 to 350 Btu's per standard cubic foot) and is at a pressure in the range of 20.4 to 34 atm (300 to 500 psia). Following the removal of sulfur compounds, the clean fuel gas stream is passed through line 23 to the combustor 24 of the gas turbine 26 where it is partially oxidized by reaction with air to raise its temperature to a temperature level within the range of 815° to 1370° C. (1500° to 2500° F.). Air for the partial oxidation in combustor 24 is compressed to a pressure in the range of 20.4 to 34 atm (300 to 500 psia) by an air compressor 27 driven by a gas turbine 26 and supplied to the combustor 24. Electric power is produced by an electrical generator driven by the gas turbine 26.

The exhaust gas stream from gas turbine 26 at a pressure in the range of 2 to 3.4 atm (30 to 50 psia) contains carbon monoxide and hydrogen and has a higher heating value in the range of 1.49 to 11.18 MJ/m$^3$ (40 to 300 Btu's per standard cubic foot). This low heating value fuel is subjected to complete combustion with air in a combustor 31 associated with a pressurized boiler 32 to generate steam. Relatively cool flue gases are discharged from the boiler and are passed through a flow line 33 to a gas turbine 34. The flue gases or products of complete combustion enter the turbine at a pressure in the range of 2 to 3.5 atm (30 to 50 psia) and at a temperature in the range of 425° to 1100° C. (800° to 2000° F.) wherein it is expanded to substantially atmospheric pressure with the generation of power. Air for the combustion of the low heating value fuel is compressed to the required pressure of 2 to 3.5 atm by means of an air compressor 36, which may be driven directly by the gas turbine 34, and is passed through flow line 37 to the combustor 31. Electrical energy may be generated by electrical generator 38 driven by the gas turbine 34.

When the combustor 31 forms a part of the pressurized steam boiler 32, steam may be supplied from the boiler 32 to a steam turbine 41 which may drive an electrical generator 42. Exhaust steam from the steam turbine 41 may be condensed in a surface condenser 43 and a water leg condenser 44. Steam may be delivered through line 46 as process steam for the plant, for example, as a source of steam supply to line 17 if steam is required for gasification of the fuel.

With reference to FIG. 2 of the drawings, the following is a specific example of a preferred embodiment of the present invention. With reference to the figure, air is compressed in a multi-stage compressor 10 to a pressure of 126.9 atm (1865 psia) and delivered through supply line 11 at 260° C. (500° F.) at a rate of 401,157 Kg/hr (884,400 lbs/hr) to a mixer-burner 12 of a high pressure partial oxidation reactor 13. Ten thousand barrels per day of vacuum residuum having a sulfur content of 4.9% by weight and a lower heating value of 39 MJ/Kg (16,771 Btu's/lb) is supplied by pump 14 to burner 12 of gasifier 13 at the rate of 67,041 Kg/hr (147,800 lbs/hr) and at a temperature of 260° C. Non-catalytic partial oxidation of the fuel to carbon monoxide and hydrogen takes place in reactor 13 at 123 atm (1815 psia) and 1400° F.) producing 468,198 Kg/hr (1,032,200 lbs/hr) or product gas.

After separation of slag in separator 18, the temperature of the gaseous effluent from reactor 13 is reduced to about 1200° C. (2200° F.) by the addition of 108,590 Kg/hr (239,400 lbs/hr) of exhaust gas at 50° C. (120° F.) supplied at line 52 as described hereinafter. The resulting mixture amounting to 576,788 Kg/hr (1,271,600 lbs/hr) is passed at 1200° C. and 123 atm into turbine 19 for the generation of power, wherein its pressure is reduced to 31 atm (455 psia) and its temperature reduced to 830° C. (1530° F.). The exhaust gas from the turbine 19 passes through line 23 to combustor 24 of gas turbine 26. Compressed air from air compressor 27 is delivered at a pressure of 31 atm and 200° C. (390° F.) to the combustor 24 at a rate of 125,963 Kg/hr (277,700 lbs/hr) wherein the fuel gas is partially oxidized to produce 702,750 Kg/hr (1,549,300 lbs/hr) of a low heating value fuel gas at a temperature of 1205° C. (2200° F.) and a pressure of 30 atm (440 psia) which is supplied to turbine 26 wherein its pressure is reduced to 7.5 atm (110 psia) and its temperature reduced to 840° C. (1545° F.) producing power.

Low heating value gas from turbine 26 is passed to a cooler 29 in the form of a steam boiler supplied with boiler feed water (BFW) and producing steam for a steam turbine, not illustrated. In cooler 29, the low heating value gas is cooled to a temperature of 650° C. (1200° F.) and then passed to a heat exchanger 30 where it is further cooled to a temperature of 150° C. (300° F.). After further cooling with cooling water to a temperature of 95° C. (200° F.), the low heating value fuel gas, at a pressure of approximately 6.8 atm (100 psia) is supplied to the acid gas removal system 22 wherein 39,326 Kg/hr (86,700 lbs/hr) of carbon dioxide and sulfur containing gases are removed to produce a sulfurfree low heating value fuel gas having a higher heating value of 2.545 MJ/m$^3$ (68.3 Btu's/cu.ft.). The clean, low heating value gas is passed at a rate of 663,424 Kg/hr (1,462,600 lbs/hr) to heat exchanger 30 where it is heated from a temperature of 40° C. (100° F.) to a temperature of 595° C. (1100° F.) and supplied at a pressure of 5.1 atm (75 psia) to a burner 31 of pressure boiler 32.

Compressed air from air compressor 36 is supplied to the burner 31 of the pressure boiler 32 through line 37 at 5.1 atm (75 psia) and at a temperature of 150° C. (300° F.) at a rate of 363,554 Kg/hr (801,500 lbs/hr) for complete combustion of the low heating value fuel gas with the production of steam. Clean flue gas from the pressure boiler 32 at a pressure of 5.1 atm and a temperature of 200° C. (390° F.) is passed at a rate of 1,026,978 Kg/hr (2,264,100 lbs/hr) to a flue gas turbine 34 via line 33. In the gas turbine 34, the pressure of the flue gas is reduced to approximately 1 atm (15 psia) and its temperature is reduced to 50° C. (120° F.).

A portion of the exhaust gas from turbine 34, amounting to 108,590 Kg/hr (239,400 lbs/hr), is passed through line 50 to compressor 51 wherein its pressure is raised to 123 atm (1815 psia) and its temperature increased by heat of compression of 200° C. (390° F.). The compressed flue gas is introduced into admixture with hot gas from gasifier 13 prior to its introduction to turbine 19 to moderate the temperature of the gases from the gasifier to approximately 1200° C. The remainder of the flue gas, amounting to 918,388 Kg/hr (2,024,700 lbs/hr), is discharged to the atmosphere as clean, non-polluting exhaust gases.

Relatively low temperatures employed throughout the process result in low NOx content in the effluent gases discharged from the system to the atmosphere. The process provides for substantially maximum energy conversion with conventional, proven equipment while substantially eliminating emissions of oxides of sulfur and nitrogen to the atmosphere. In the specific example above, the clean cool exhaust gases typically at a temperature in the range of about 40° to about 55° C., just sufficient to avoid water condensation, may be discharged near ground level eliminating the need for expensive stacks.

In the specific example, with a compressor efficiency of 85%, a turbine efficiency of 89%, and a combustion efficiency of 100%, and with 5% excess air to the pressurized boiler, the plant produces 294 megawatts of electric power with an efficiency, based on the lower heating value of the fuel charge of 40.46%. This compares favorably with the 38.05% efficiency available from a corresponding steam plant. It is evident, therefore, that the process of this invention provides a highly efficient means for generating power from sulfur-containing fuels of from nitrogen-containing fuels without atmospheric pollution.

In this specific example, the heat recovery from the pressurized boiler amounts to $1.635 \times 10^6$ MJ/hr ($1.55 \times 10^9$ Btu's/hr), the heat recovery by the waste heat boiler amounts to $1.669 \times 10^5$ MJ/hr ($1.582 \times 10^8$ Btu's/hr) and that of the feed water heater, $4.389 \times 10^4$ MJ/hr ($4.16 \times 10^7$ Btu's/hr) for a total of $1.846 \times 10^6$ MJ/hr ($1.750 \times 10^9$ Btu's/hr). Steam turbines operating on the steam produced in the boilers are capable of extracting $7.174 \times 10^5$ MJ/hr ($6.8 \times 10^8$ Btu's/hr) as power or 47.6% of the total produced by the plant and the gas turbines are capable of extracting $7.9 \times 10^5$ MJ/hr ($7.50 \times 10^8$ Btu's/hr) or 52.4% of the total power generated by the plant. The plant in this specific example produces 294 megawatts with a plant overall efficiency of 40.46% as mentioned above.

In the preferred specific embodiment of the process of this invention as described above, a sulfur-containing fuel is used for illustration of its operation. Fuels which do not contain sulfur, such as sweet natural gas or low sulfur fuel oils are admirably suited as feed for the process; the process, however, offers a pollutionfree route to power generation from fuels which contain sulfur and therefore create air pollution problems when supplied to conventional power plant boilers. If pollution-free fuels are employed, the acid gas removal step may be omitted. If desired, the pressure boiler 32 may be omitted and the products of combustion from combustor 31 passed directly to gas turbine 34.

Relatively low temperatures employed throughout the process result in low NOx content in the effluent gases discharged from the system to the atmosphere. The process provides for substantially maximum energy conversion with conventional, proven equipment while substantially eliminating emissions of oxides of sulfur and nitrogen to the atmosphere.

We claim:

1. In a process for the generation of power from a carbonaceous or hydrocarbonaceous fuel wherein said fuel is subjected to combustion in a closed combustion chamber under elevated pressure and resulting products of combustion expanded in a gas turbine to generate power, the improvement which comprises:
    (a) subjecting said fuel to partial oxidation with an oxygen-containing gas at a pressure above 40 atm (590 psia) and a temperature in the range of 980° to 1650° C. (1800° to 3000° F.) effecting conversion of said fuel to a high pressure fuel gas stream containing carbon monoxide, hydrogen and methane and having a higher heating value in the range of 2.24 to 18.63 MJ/m$^3$ (60 to 500 Btu's/ft$^3$),
    (b) expanding said high pressure fuel gas stream from (a) in an engine to an intermediate pressure within the range of 20.4 to 34 atm (300–500 psia) effecting simultaneously cooling of said fuel gas stream and production of power,
    (c) subjecting said fuel gas stream to partial oxidation with air at said intermediate pressure in the range of 20.4 to 34 atm (300 to 500 psia) and at a temperature in the range of 815° to 1370° C. (1500° to 2500° F.) effecting conversion of said fuel gas to a low heating value gaseous mixture comprising hydrogen and carbon oxides, said gaseous mixture having a higher heating value in the range of 1.49 to 8.68 MJ/m$^3$ (40 to 233 Btu's/ft$^3$),
    (d) expanding said low heating value gaseous mixture from (c) in an engine to a low pressure in the range of 2 to 3.5 atm (30 to 40 psia) producing power,
    (e) subjecting said low heating value gaseous mixture to substantially complete combustion with air at a pressure in the range of 2 to 3.5 atm (30 to 50 psia) producing flue gases comprising products of complete combustion, and
    (f) expanding said flue gas in an engine to substantially atmospheric pressure with the production of power.

2. A process according to claim 1 wherein combustion of said low heating value gaseous mixture is carried out in a furnace with removal of heat and production of steam, and resulting relatively cool flue gas at a pressure of 2 to 3.5 atm (30 to 50 psia) expanded in an engine to substantially atmospheric pressure with the production of power.

3. A process according to claim 2 wherein steam produced by combustion of said low heating value gas is expanded in an engine to produce power.

4. A process according to claim 1 wherein said carbonaceous or hydrocarbonaceous fuel contains sulfur compounds, the products of partial combustion at a pressure above 68 atm (1000 psia) contain gaseous sulfur compounds, and said gaseous sulfur compounds are removed from said fuel gas stream at said intermediate pressure within the range of 20.4 to 34 atm (300 to 500 psia).

5. A process according to claim 1 wherein said carbonaceous or hydrocarbonaceous fuel contains sulfur compounds, the products of partial combustion at a pressure above 68 atm (1000 psia) contain gaseous sulfur compounds, and said gaseous sulfur compounds are removed from said fuel stream at said low pressure within the range of 2 to 3.5 atm (30 to 50 psia).

6. In a process for the generation of power from a liquid or solid sulfur-containing fuel wherein said fuel is subjected to partial oxidation with air or oxygen at elevated pressure effecting conversion of said sulfur-containing fuel to a fuel gas stream having a higher heating value in the range of 60 to 350 Btu's per cubic foot and comprising carbon monoxide, hydrogen, methane and gaseous sulfur compounds, and said gaseous sulfur compounds are removed from said fuel gas stream, the improvement which comprises:

(a) subjecting said fuel gas stream to partial oxidation with air at said pressure in the range of 300 to 500 psia and at a temperature in the range of 1500° to 2500° F. effecting conversion of said fuel gas to a low heating value gaseous mixture comprising hydrogen and carbon oxides, said gaseous mixture comprising hydrogen and carbon oxides and having a higher heating value in the range of 40 to 233 Btu's per standard cubic foot.

(b) expanding said low heating value gaseous mixture from (a) in an engine to a pressure in the range of 30 to 50 psia producing power, (c) subjecting said low heating value gaseous mixture to substantially complete combustion with air at a pressure in the range of 30 to 50 psia producing flue gases comprising products of complete combustion, and (d) expanding said flue gases in an engine to substantially atmospheric pressure with the production of power.

7. A process according to claim 6 wherein combustion of said low heating value gaseous mixture is carried out in a furnace at a pressure in the range of 30 to 50 psia with removal of heat by the generation of steam and the resulting relatively cool products of combustion expanded to substantially atmospheric pressure in a turbine with the production of power.

* * * * *